United States Patent [19]

Motoyama et al.

[11] Patent Number: 5,375,205
[45] Date of Patent: Dec. 20, 1994

[54] METHOD AND APPARATUS FOR CONTROLLING THE BUFFER SCAN IN A PRINTER CONTROLLER

[75] Inventors: Teturo Motoyama, San Jose; Chan Kim, Fremont; Jimmy G. Lo, Milpitas, all of Calif.

[73] Assignees: Ricoh Co., Ltd., Tokyo, Japan; Ricoh Corporation, San Jose, Calif.

[21] Appl. No.: 33,420

[22] Filed: Mar. 18, 1993

Related U.S. Application Data

[63] Continuation of Ser. No. 557,,971, Jul. 26, 1990, abandoned.

[51] Int. Cl.⁵ .............................................. G06F 15/62
[52] U.S. Cl. .................................. 395/166; 395/107; 395/148

[58] Field of Search ................ 395/107, 117, 144–149, 395/164, 166; 364/DIG. 2; 345/118, 189, 190

[56] References Cited

U.S. PATENT DOCUMENTS

| | | | |
|---|---|---|---|
| 4,555,775 | 11/1985 | Pike | 364/DIG. 2 |
| 5,086,497 | 2/1992 | Horikawa et al. | 395/148 X |
| 5,129,053 | 7/1992 | Makihara | 395/117 X |

Primary Examiner—Heather R. Herndon
Assistant Examiner—Almis Jankus

[57] ABSTRACT

A method and apparatus for controlling the buffer scan and placing the origin of the buffer allows software to control laser printer hardware in such a way that the hardware can scan data in a bit map correctly and send the data to a laser printer. The present invention places the output image from Y lines below the top of the page and X dots right from the left margin.

27 Claims, 9 Drawing Sheets

FIG. −6

METHOD AND APPARATUS FOR CONTROLLING THE BUFFER SCAN IN A PRINTER CONTROLLER

This is a continuation of application Ser. No. 07/557,971 filed Jul. 26, 1990, now abandoned.

CROSS REFERENCE TO RELATED APPLICATIONS

This application is related to Chang et al., U.S. Pat. No. 4,977,519, issued on Dec. 11, 1990, entitled "Laser Printer Controller Flexible Frame Buffer Architecture which Allows Software to Change X and Y Dimension of the Buffer", and also related to Chang et al., U.S. Pat. No. 4,984,182, issued on Jan. 8, 1991, entitled "Laser Printer Controller Flexible Frame Buffer which Allows Software to Initiate the Loading of a Frame Start Address." These two U.S. Patents are assigned to the same assignee as the present invention, and the details of which are hereby incorporated by reference.

BACKGROUND OF THE INVENTION

The present invention relates to a method and apparatus for controlling the buffer scan in a laser printer and placing the origin of the buffer.

Current development of page description languages (PDL) such as PostScript from Adobe, Interpress from Xerox, Standard Page Description Language (SPDL) made a bit map memory a necessary means to buffer a page image which is sent to a laser printer. The reason for the bit map memory is that a user can create an arbitrarily complex page. Moreover, a laser printer cannot stop until it prints an entire page, which causes a band buffer to fail if the page is too complex.

The coordinate systems commonly used by languages such as PDL are user coordinate and device coordinate. Users of PDL can set the mapping between these two coordinates. The most natural origin of these coordinate systems is the bottom left corner. Users of PDL can work with this origin quite naturally. However, the top left corner of the paper is the natural origin for a laser printer. This is due to the paper movement and laser scanning.

Firmware engineers of PDL had to take care of this mismatch between two origins in the past. When the CPU of PDL was a general purpose CPU, addressing each pixel was difficult, but adjustment of two origins was not a significant problem. However, the recent advance of graphic processors allows firmware engineers to use natural X-Y coordinate systems to develop software. Therefore, having two different origins is not a suitable environment.

In many cases, X-Y coordinate systems work faster when the X dimension is a power of 2. Therefore, even when 2400 dots are needed to handle 8 inches for a 300 dots per inch (DPI) laser printer, 4096 dots must be specified to take advantage of a special graphics chip. During the debug stage, however, 1024 dots may be sufficient for x dimension. FIGS. 1 and 2 show these two cases. In general, firmware engineers want to have flexibility to change the dimension of the bit map.

Additional flexibility required is the ability to place the page image data anywhere in the physical paper. This flexibility may be needed if additional space on the left edge is required for three-hole punch after the page image data are generated.

In one approach described in the above cross-referenced application, there is provided therein a flexible buffer where a user controlled the register for the X and Y dimensions of the buffer. The problems of that approach are: 1) cannot decrement Y values to adjust to the different origin; 2) cannot handle the case where the bit map and actual data dimensions are different.

SUMMARY OF THE INVENTION

It is an object of the present invention to provide an improved flexible frame buffer.

It is another object of the present invention to allow software to control hardware in such a way that hardware can scan the data in a bit map correctly and can send the data to a laser printer.

It is another object of the present invention to place the output image starting anywhere on the page.

It is yet another object of the present invention to scan y lines or x dots in reverse directions.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in, the appended claims.

BRIEF DESCRIPTION OF THE DRAWINGS

The accompanying drawings which are incorporated in and form a part of this specification illustrate a preferred embodiment of the invention and, together with the following description, serve to explain the principles of the invention.

DETAILED DESCRIPTION OF THE DRAWINGS

Reference will now be made in detail to a preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 3:
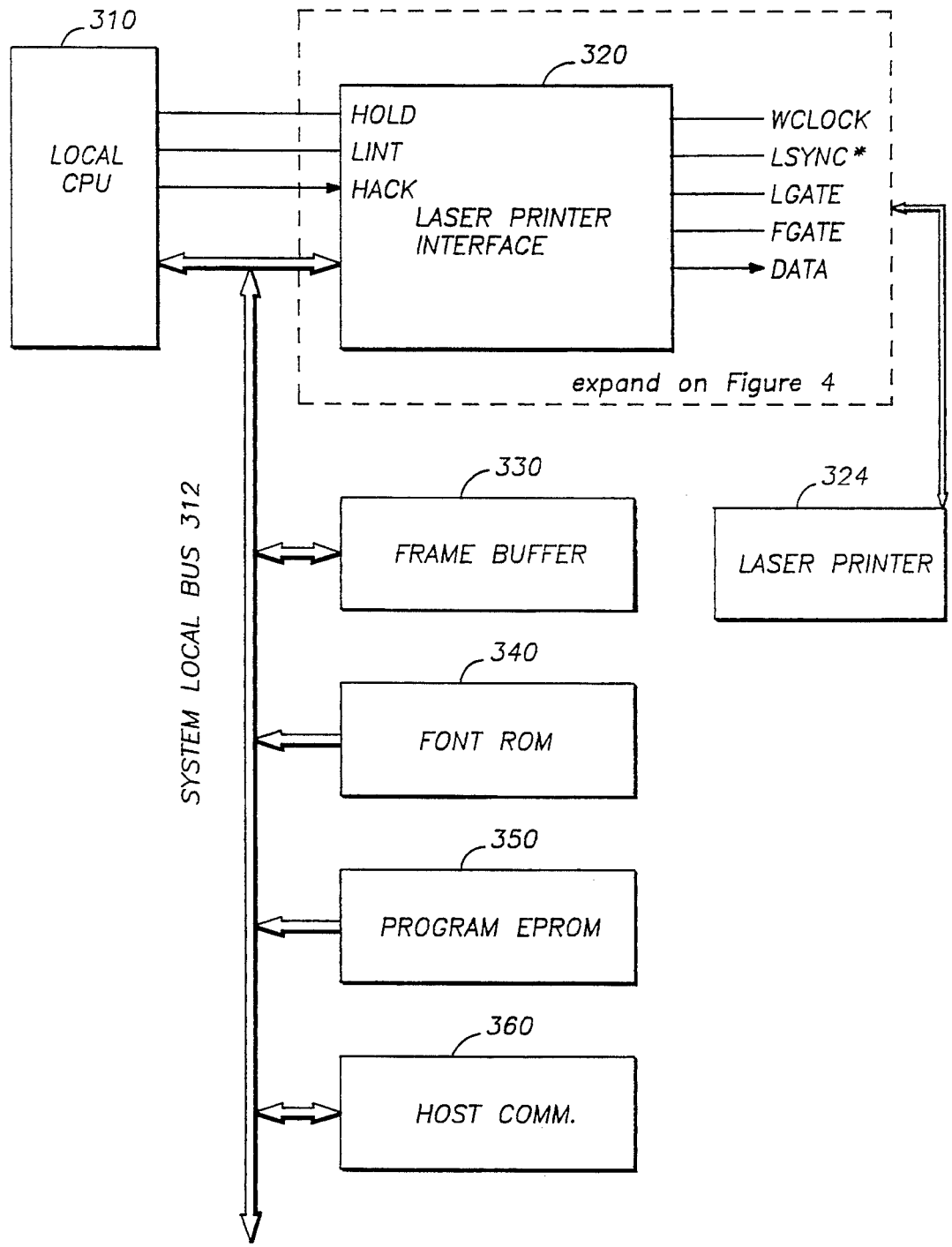
FIG. 3 depicts a block diagram of a laser printer controller system according to the present invention.

FIG. 3 depicts a block diagram of a Laser Printer Controller system according to the present invention. In FIG. 3, a Local Central Processing Unit (CPU) 310 is connected to the other components of the Laser Printer Controller System via a System Local Bus 312. System Local Bus 312 is connected to a Frame Buffer 330, Font ROM 340, Program EPROM 350, and Host Communications 360. Also, CPU 310 is connected to Laser Printer Interface 320 via System Local Bus 312. CPU 310 also provides the HOLD, LINT and HACK control signals to Laser Printer Interface 320.

Laser Printer Interface 320 receives the WCLOCK, LSYNC*, LGATE, FGATE signals from a Laser Printer 324 and provides the Data signals. More details of the Laser Printer Interface 320 of FIG. 3 are described in connection with the description of FIG. 4.

In FIG. 3, Frame Buffer 330 contains means for storing a bit map representing the image data. The Laser Printer Interface 320 circuit is responsible for moving data from the Frame Buffer to the Laser Printer. The aspects of the present invention are described in more detail in connection with the Laser Printer Interface Circuit of FIG. 4.

Figure 4:
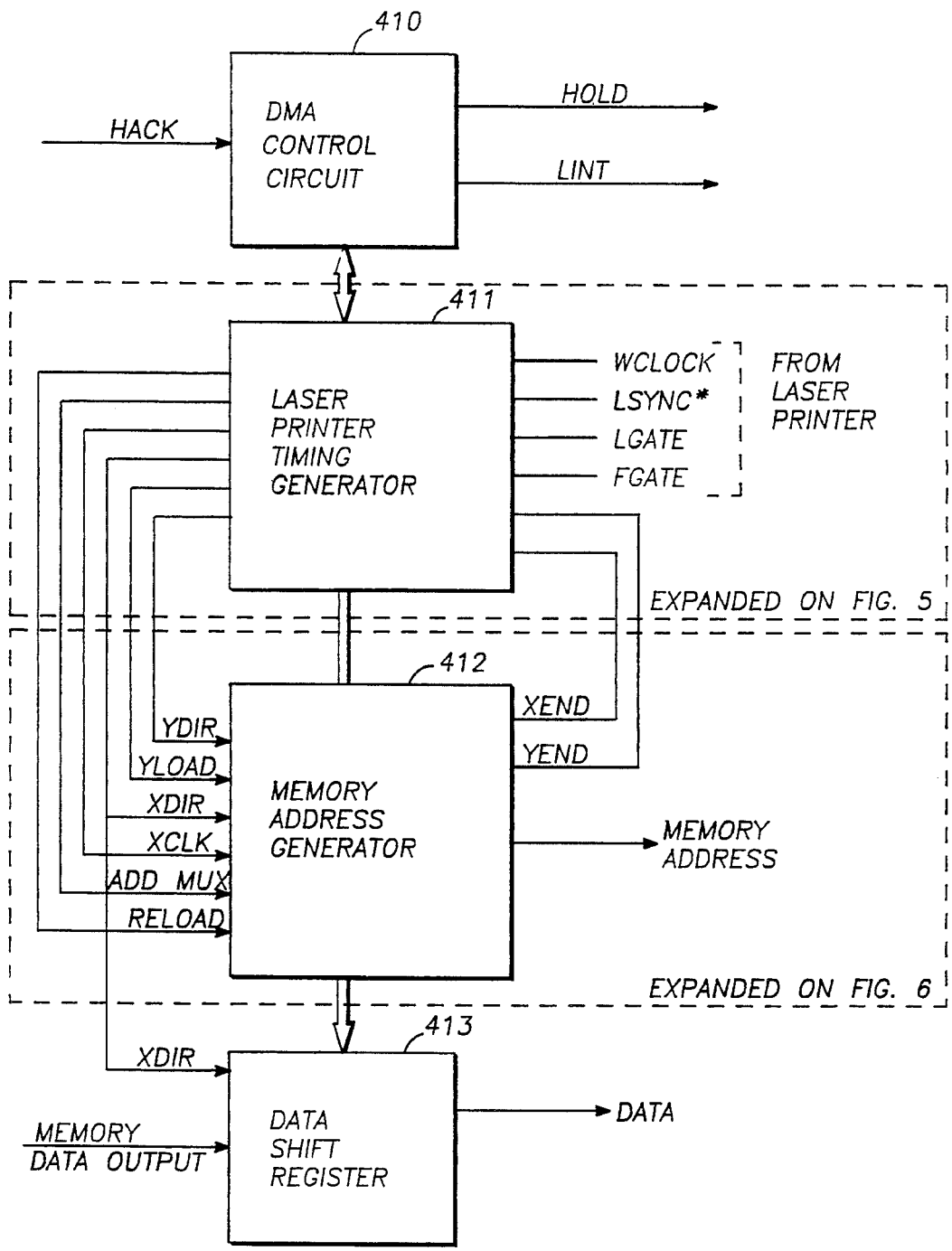
FIG. 4 depicts a diagram of a laser printer interface circuit which forms a portion of FIG. 3.

In FIG. 4, the Laser Printer Interface Circuit 320 of FIG. 3 is shown. The HACK signal from CPU 310 is input to DMA control circuit 410, which provides the HOLD and LINT signals.

Frame Buffer 330 includes a plurality of memory cells, and the memory cells are arranged in a linear sequence. The image, however, is considered in two dimensions, e,g., X dimension for scanning and Y dimension for lines. The addresses for the memory cells of Frame Buffer 330 can be computed from X dimension addresses and Y dimension addresses. Each memory cell typically includes 8, 16 or 32 bits. Each bit can store either "1" typically representing a pixel having black color (a black dot) or "0" typically representing a pixel having white color (a white dot).

In FIG. 4, DMA control circuit 410 is connected to Laser Printer Timing Generator 411. The Laser Printer Timing Generator 411 receives the WCLOCK, LSYNC* LGATE and FGATE signals from the Laser Printer 324.

Laser Printer Timing Generator 411 provides to Memory Address Generator 412 the YDIR, YLOAD, XDIR, XCLK, ADD_MUX and RELOAD signals. Timing generator 411 receives the XEND and YEND signals from memory address generator 412. Memory Address Generator also provides the Memory Address Signal. Data Shift Register 413 receives memory data output signals and provides data signals.

In FIG. 4, the Laser Printer Timing Generator (411) uses the synchronization signals (LSYNC*, LGATE, FGATE) to synchronize with the Laser Printer 324. It then signals the DMA Control Circuit (410) to gain control of the System Local Bus 312. Once the bus access is granted, proper memory timing is generated to move image data from the Frame Buffer 330 to the Data Shift Register (413). The Data Shift Register 413 converts the parallel data into serial data, and then sends it to the Laser Printer 324. The control signal, XDIR, controls the serialization direction. Depending upon the signal of XDIR, DATA SHIFT REGISTER 413 sends out the first bit first or the last bit first to the Laser Printer 324. In addition, depending upon XDIR, data within a line is scanned from left to right, or right to left. This may translate to reading a memory in descending or ascending order within a memory block of a line.

Figure 5:
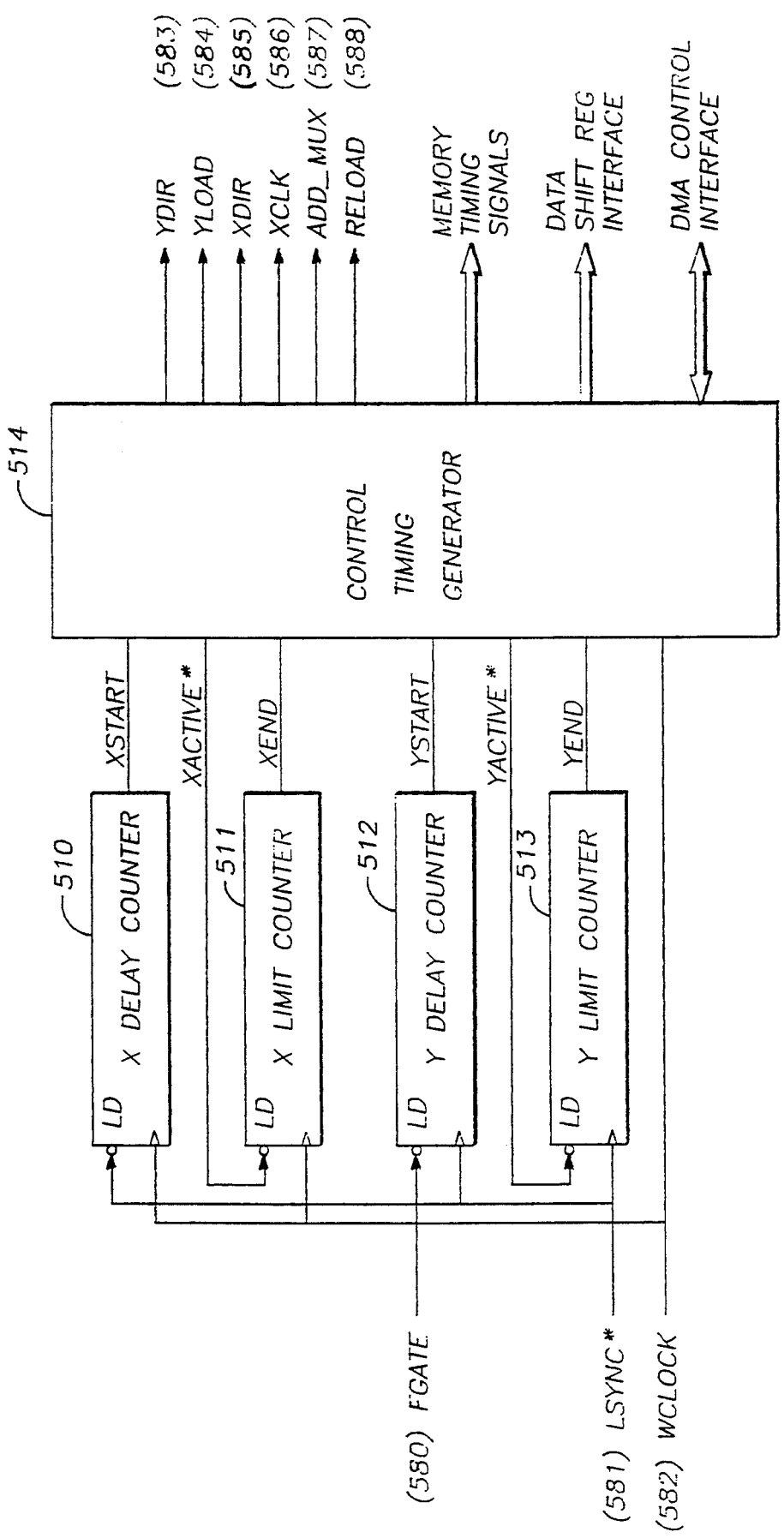
FIG. 5 depicts a diagram of a laser printer timing generator which forms a portion of FIG. 4.
Figure 6:
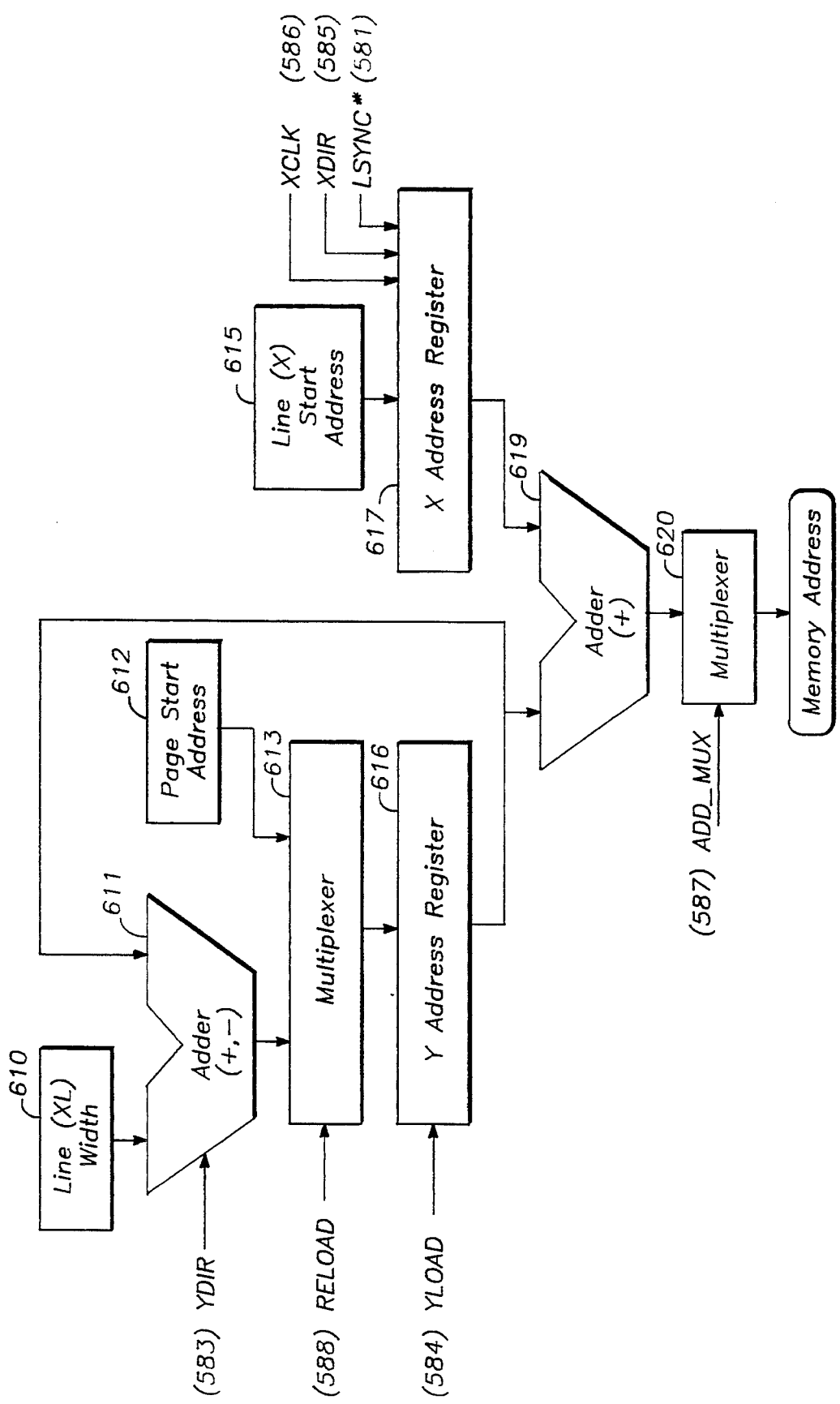
FIG. 6 depicts a diagram of a memory address generator which forms a portion of FIG. 4.

The detail of the Laser Printer Timing Generator is explained in FIG. 5, and the detail of the Memory Address Generator is explained in FIG. 6.

Timing Generator of FIG. 5 includes an X Delay Counter 510, X Limit Counter 511, Y Delay Counter 512 and Y Limit Counter 513. Input to the respective counter circuits 510, 511, 512, 513 are the LSYNC* 581 signal, WCLK 582, and FGATE 583.

The X Delay counter 510 provides an XSTART signal to Control Timing Generator 514. Similarly, Y Delay Counter 512 provides a Ystart signal to Timing Generator 514.

X Limit Counter 511 provides the XEND signal to Timing Generator 514. Similarly, the Y Limit counter 513 provides the YEND signal to Timing Generator 514.

Timing Generator 514 provides the XACTIVE signal to X Limit Counter 511, and the YACTIVE signal to Y Limit Counter 513.

Timing generator 514 provides the YDIR, YLOAD, XDIR, XCLK ADD MUX, and RELOAD Signals, which are input to the Memory Address Generator 412 of FIG. 4.

Also, Control Timing Generator 514 generates Memory Timing signals, Data Shift Register Interface signals and interfaces with the DMA control interface 410 of FIG. 4.

Referring now to FIG. 5, four counters are used to control the starting position of image data and the size of the image data. All of these counters are 16-bit and software programmable. The X Delay Counter (510) contains the number of dots to skip after the LSYNC* (581) signal becomes inactive. It is used to control spaces from the left or right page margin, depending upon XDIR.

The X Limit Counter (511) holds the number of the active dots per scan line. When the X Limit Counter 511 reaches the value set by the software, an XEND signal is sent to the Control Timing Generator (514) to blank off the data. The Y Delay Counter (512) contains the number of scan lines to skip after the FGATE (580) signal becomes active. This counter controls the top or bottom page margin, depending upon YDIR.

The Y Limit Counter (513) holds the number of active scan lines. When the Y Limit Counter 513 value reaches the value set by the software, a YEND signal is sent to the Control Timing Generator (514). The Control Timing Generator will then either blank off the rest of the page or send the RELOAD (588) signal to Memory Address Generator (FIG. 6), reloading the original starting address.

Referring now to FIG. 6, the memory address generator 412 of FIG. 4 is shown in more detail.

Memory Address Generator 412 in FIG. 6 includes an Adder 611 which receives the YDIR signal 583. In addition, Adder 611 receives as an input the Line (XL) Width 610.

Memory Address Generator 412 of FIG. 6 also includes a Page Start Address Circuit 612, which provides an input to Multiplexer 613. Multiplexer 613 also receives the output of Adder 611 and is controlled by RELOAD signal 588.

The output of Multiplexer 613 is input to Y Address Register 616, which receives the YLOAD signal 584.

The output of Y Address Register 616 forms an input to Adder 611 together with the Line (XL) Width 610. The output of Y Address Register 616 is also input to Adder 19.

Memory Address Generator of FIG. 6 also includes line (X) start address 615, which is input to X Address Counter 617. X Address Counter 617 also receives the XCLK 586, XDIR 585, and LSYNC* 581 signals.

The output of X Address Counter 617 forms the other input to Adder 619. The output of Adder 619 forms an input to Multiplexer 620, which receives the ADD_MUX control signal. The output of Multiplexer 620 is the memory address signal.

In FIG. 6, the Y Address Register (616) contains the starting address of every scan line. The X Address Counter (617) holds the offset address reference to the start of the line. The X Address Counter is increased or decreased on every XCLK (586) depending on the XDIR signal (585).

The final physical address can be generated by adding the line start address (Y Address Register) and the offset from the line start address (X Address Counter) together. YLOAD (584) is activated at the beginning of every scan line. Depending on the RELOAD signal (588), Y Address Register is loaded with the Page Start Address (612) or the starting address of the next scan line.

Figure 1:
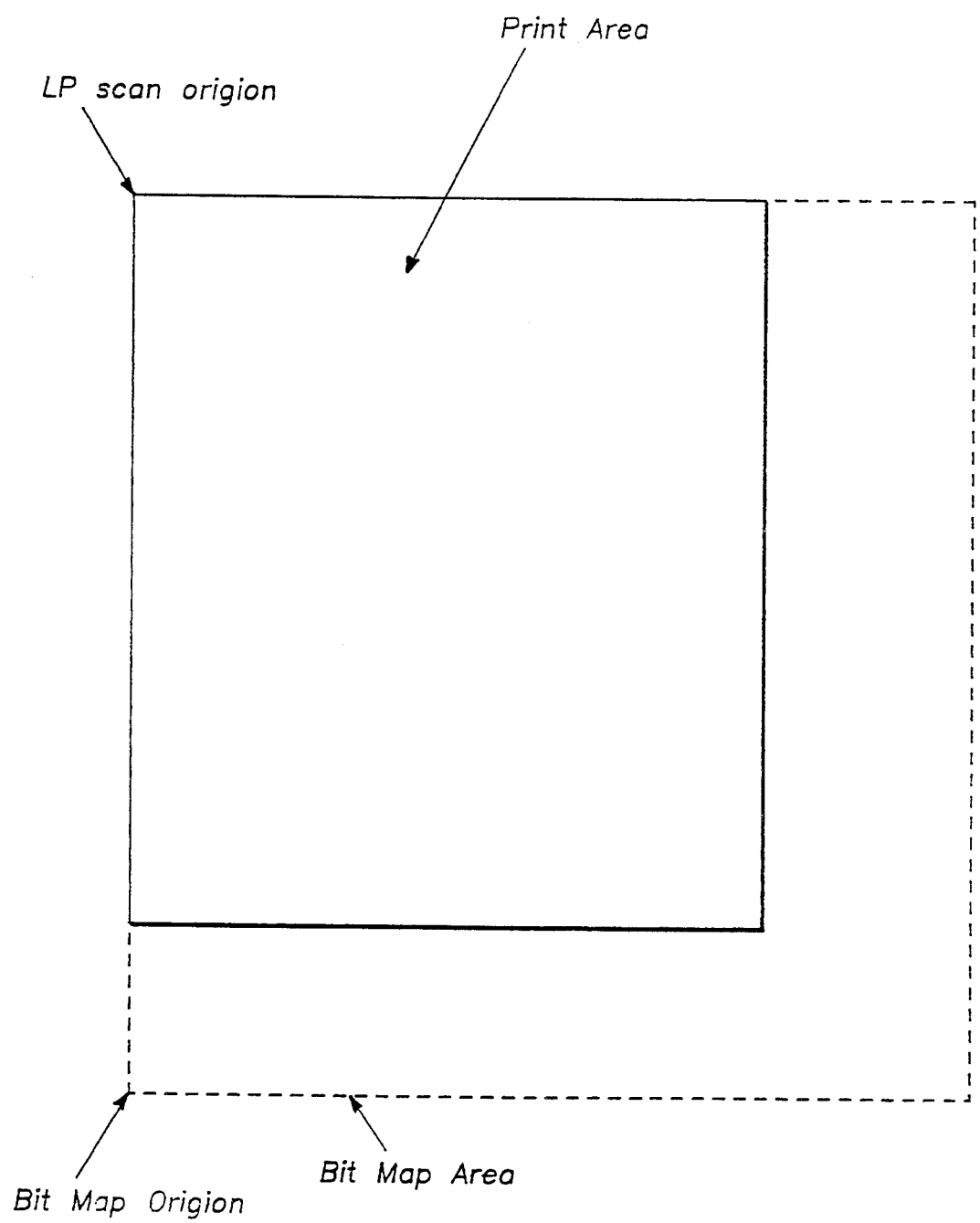
FIGS. 1 and 2 depict bit map and print areas, as discussed in the Background of the Invention.
Figure 2:
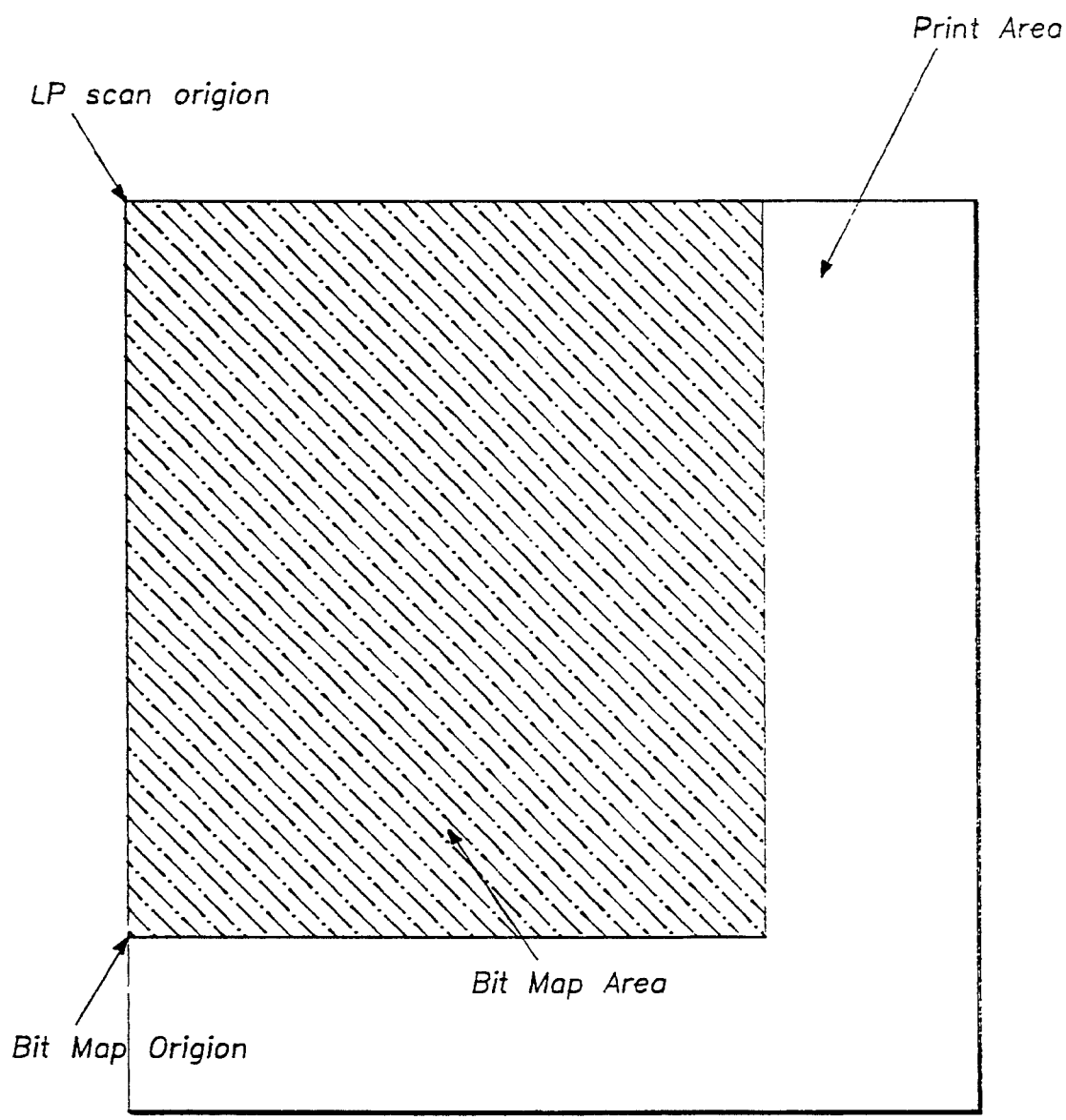

The next line start address is calculated by either adding or subtracting the Line Width (610) from the current starting address, depending on the YDIR signal (583). Line Width is the buffer line width used by software. Its value can be bigger than page in the case of FIG. 1 and smaller than page in the case of FIG. 2.

Figure 7:
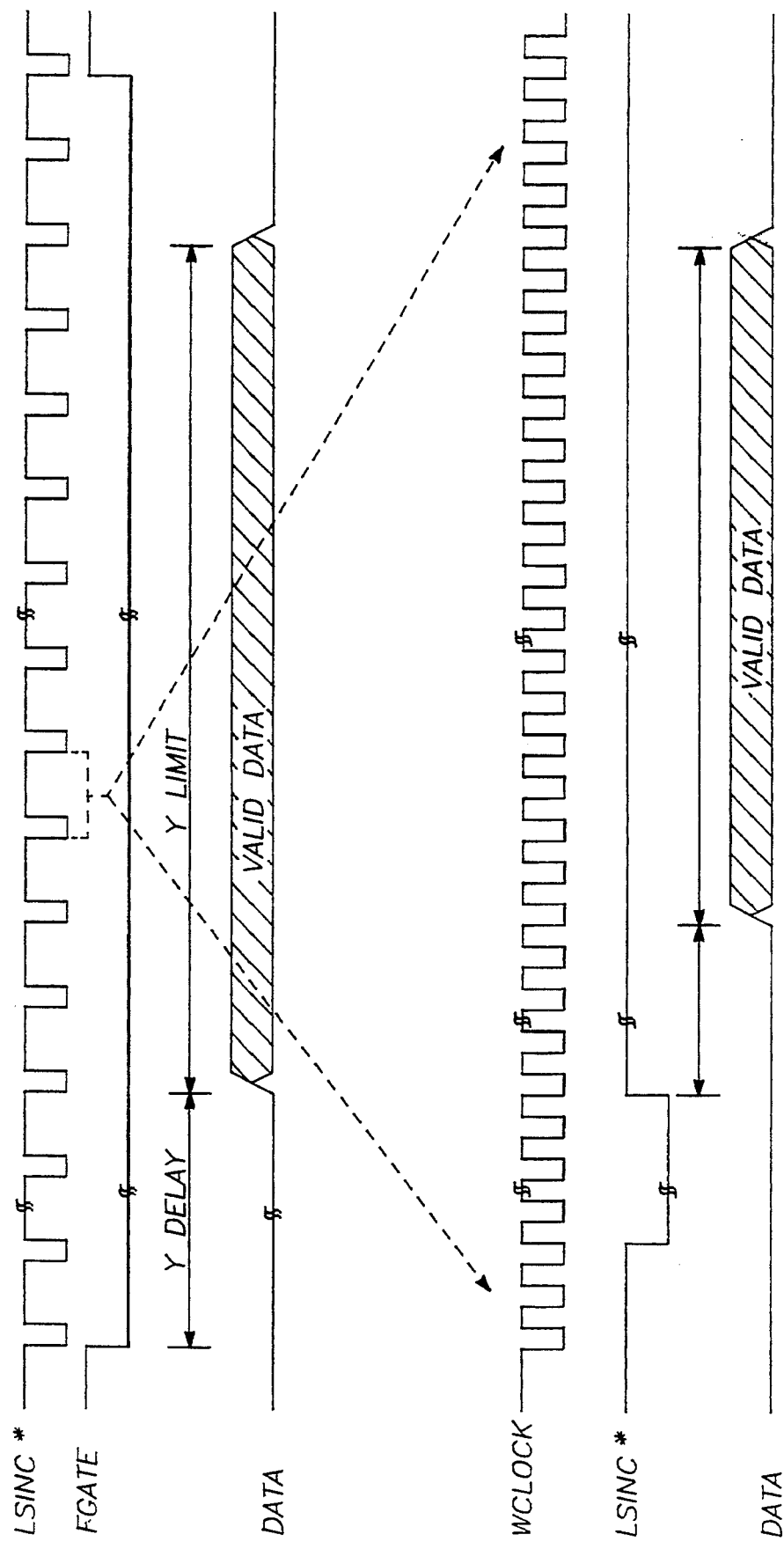
FIG. 7 depicts timing waveforms as utilized with the present invention.

FIG. 7 shows the timing waveforms for the LSYNC*, FGATE, and data signals. Also, FIG. 7 shows in more detail the WCLOCK signal.

Figure 8:
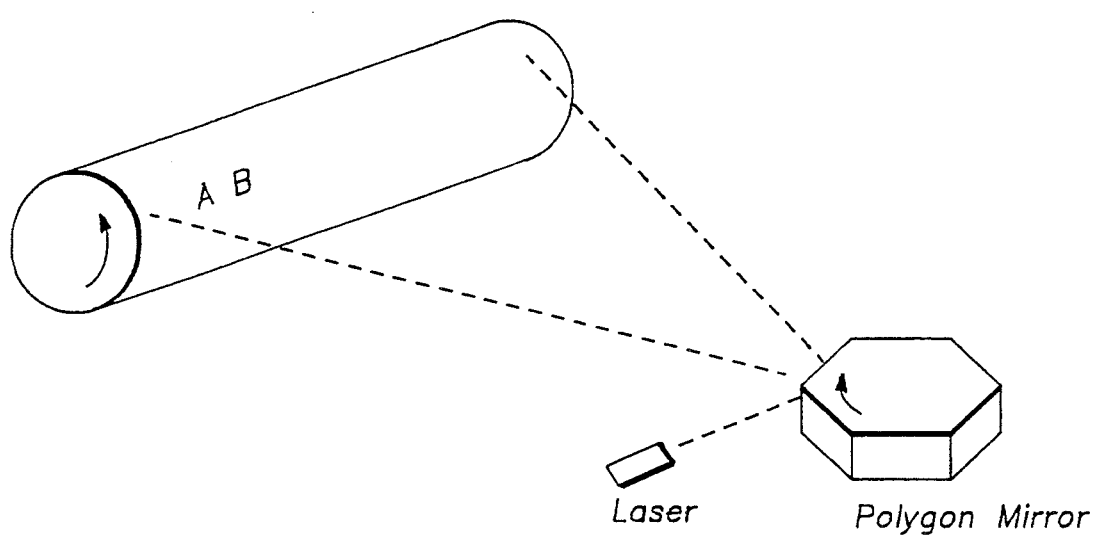
FIG. 8 depicts laser scanning to create latent images on a transfer means.

FIG. 8 shows the laser scanning portion of a Laser Printer. Scanning is related to the dots in the X direction, while the movement of paper along with the rotation of polygon mirror is related to they direction of lines.

Figure 9:
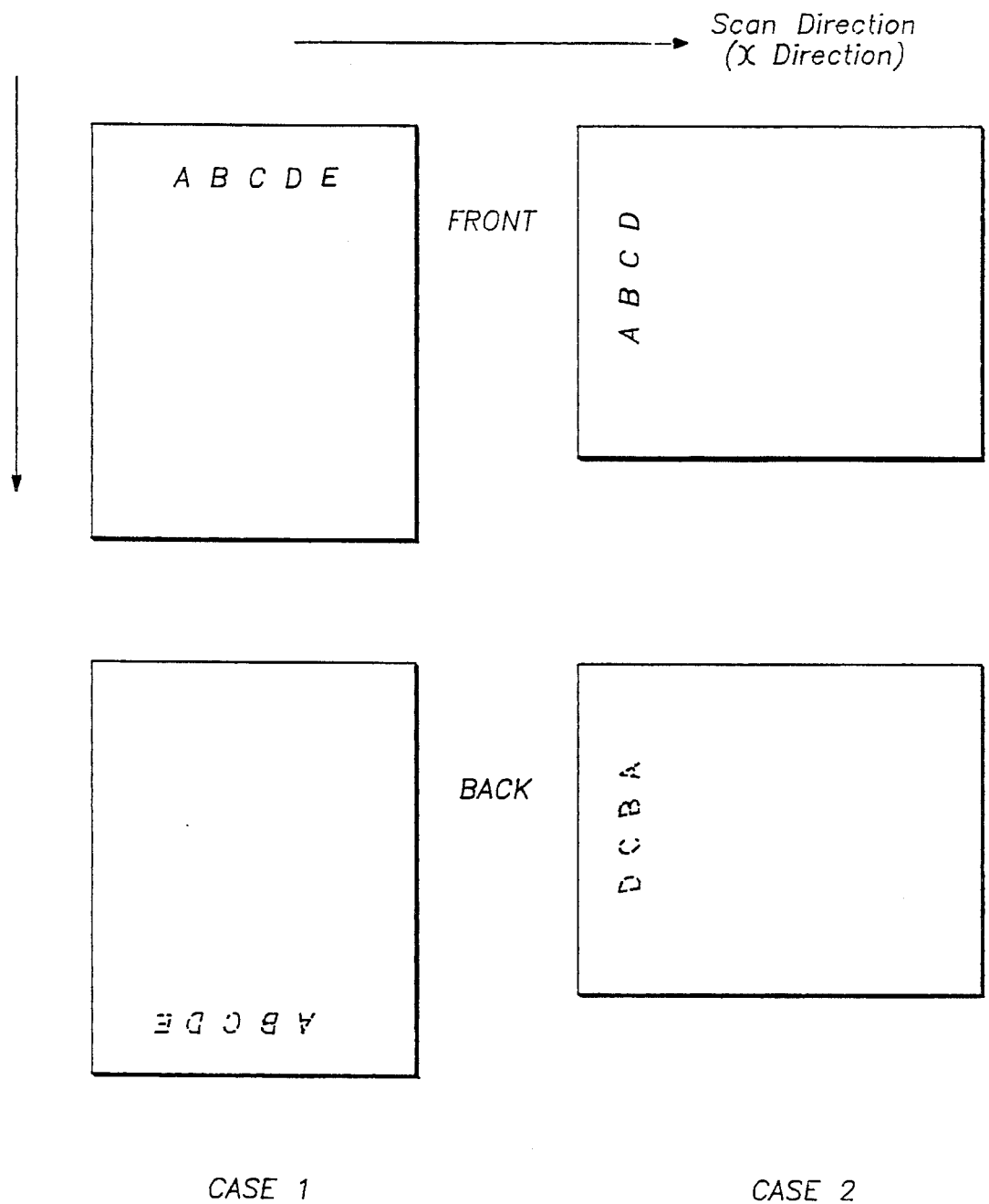
FIG. 9 depicts examples of paper conditions before and after paper turn by a duplexer.

FIG. 9 shows in case 1 that normal printing will result in the wrong output for the two-sided print, while in case 2 normal printing will result in the right output. In order to obtain the correct output for case 1, the image data must be scanned out from the lower right corner using X DIR and Y DIR.

The foregoing description of the preferred embodiment of the present invention allows the following applications. X delay 510 allows the shifting of the image data toward the right if the scanning of the data is from left to right. This allows adding more margin for a three-hole punch after the page image data are processed in the buffer. Y delay 512 allows the shifting of the image data toward the bottom. This allows adding more top margin for a two-hole punch. X limit 511 allows the selection of only a first X limit number of dots from each line. Y limit 513 allows the selection of only a first Y limit number of lines. The combination of X DIR and Y DIR allows the image data to be read out from the bottom right of the Frame Buffer to a printer with scan direction from right to left. This application is very useful to deal with a duplexer which turns the paper to print on the back.

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. An image controller system for displaying an image onto a pre-determined area, said image being arranged as a bit map, said bit map and pre-determined area having an X dimension and a Y dimension, said bit map having a plurality of bit positions consisting of a plurality of bit-lines that are parallel to said X dimension, said image controller system comprising:

storage means for storing said bit map to be displayed on said pre-determined area, with each of said memory cells associating with an address, and each of said plurality of bit positions associating with an address of said storage means, means, corresponding to a predetermined portion of said bit map, for indicating a boundary of a portion of said storage means including first delay means for indicating a scanning origin position on said pre-determined area along said X dimension and second delay means for indicating scanning origin position on said pre-determined area along said Y dimension, said portion of said storage means associating with said pre-determined portion of said bit map, and control means for controlling scanning of said portion of said storage means in response to said boundary indicating means.

2. The system as in claim 1 wherein said means for indicating said boundary of a portion of said storage means further comprising:

first limit means for indicating total length of a bit-line of said bit map, and second limit means for indicating total scanning bit-lines along said Y dimension.

3. The system as in claim 2 wherein said control means includes:

means for controlling changing scanning direction of said bit map.

4. The system as in claim 3 wherein said means for indicating said boundary of a portion of said storage means further includes:

first bit map scanning direction indicating means for indicating a first scanning direction and a second scanning direction along said X dimension, and wherein said control means scans said storage means according to a scanning direction along said X dimension indicated by said first scanning direction indicating means.

5. The system as in claim 4, wherein said means for indicating said boundary of a portion of said storage means further includes:

second scanning direction indicating means for indicating a first scanning direction and a second scanning direction along said Y dimension, and wherein said control means scans said storage means along said Y dimension according to a scanning direction indicated by said second scanning direction indicating means.

6. The system as in claim 4 wherein said address computing means computes said scanning addresses according to said first delay means and first limit means, and said second delay means and second limit means.

7. The system as in claim 1, wherein said pre-determined area has a plurality bit positions consisting of a plurality of bit-lines that are parallel to said X dimension, and wherein said control means includes:

means for controlling said first delay means to skip bit positions in a bit-line located before said scanning origin position along said X dimension, and means for starting sending said bit map stored in said storage means to said pre-determined area after said bit position located before said scanning origin position on said pre-determined area along said X dimension has been skipped.

8. The system as in claim 7 wherein said control means includes:

means for controlling said first limit means to stop scanning a respective bit-line of said bit map stored in said storage means along said X dimension after said total scanning length of a bit-line of said bit map has been scanned out.

9. The system as in claim 8 wherein said control means includes:

means for controlling said second delay means to skip bit-lines along said Y dimension located before said scanning origin position on said pre-determined area along said Y dimension, and means for starting sending said bit map stored in said storage means after said bit-lines located before said scanning origin position on said pre-determined area along said Y dimension have been skipped.

10. The system as in claim 9 wherein said control means includes:

means for controlling said second limit means to stop scanning said storage means along said Y dimension after said total scanning bit-lines along said Y dimension have been scanned out.

11. An image controller system for displaying an image on a pre-determined area, said image being arranged as a bit map, said bit map and pre-determined area having an X dimension and a Y dimension, said bit map having a plurality of bit positions consisting of a plurality of bit-lines that are parallel to said X dimension, said image controller system comprising:

storage means for storing said bit map to be displayed on said pre-determined area, said storage means including a plurality of memory cells with each of said memory cells associating with an address, and each of said plurality of bit positions associating with an address of said memory cells, means for indicating a scanning origin position of said bit map stored in said storage means, said scanning origin being located at any location on said pre-determined area, said means for indicating a scanning origin position being configured for being set by software, and control means for controlling scanning of said bit map stored in said storage means according to said scanning origin position.

12. An image controller system for displaying an image onto a predetermined area, said image being arranged as a bit map, said bit map and pre-determined area having area having an X dimension and a Y dimension, said bit map having a plurality bit positions consisting of a plurality of bit-lines that are parallel to said X dimension, said image controller system comprising:

storage means for storing said bit map to be displayed on said pre-determined area, with each of said memory cells associating with an address, and each of said plurality of bit positions associating with an address of said storage means, means, corresponding to a pre-determined portion of said bit map, for indicating a boundary of a portion of said storage means, said portion of said storage means associating with said pre-determined portion of said bit map, said means for indicating a boundary being configured for being set by software, and control means for controlling scanning of said portion of said storage means in response to said boundary indicating means.

13. An image controller system for displaying an image onto a predetermined area, said image being arranged as a bit map, said bit map and pre-determined area having an X dimension and a Y dimension, said bit map having a plurality bit positions consisting of a plurality of bit-lines that are parallel to said X dimension, said image controller system comprising:

storage means for storing said bit map to be displayed on said pre-determined area, with each of said memory cells associating with an address, and each of said plurality of bit positions associating with an address of said storage means, said addresses for a plurality of memory cells in said storage means being computed from said X and Y dimensions, means, corresponding to a pre-determined portion of said bit map, for indicating a boundary of a portion of said storage means including first delay means for indicating a scanning origin position along said X dimension, said portion of said storage means associating with said pre-determined portion of said bit map, and control means for controlling scanning of said portion of said storage means in response to said boundary indicating means.

14. The system as in claim 13 wherein said means for indicating a boundary further includes means for indicating total length of a bit-line along said X dimension, wherein said means for computing said scanning address computes said scanning address according to said total length of a bit-line.

15. An image controller system for displaying an image on a pre-determined area, said image being arranged as a bit map, said bit map and pre-determined area having an X dimension and a Y dimension, said bit map having a plurality bit positions consisting of a plurality of bit-lines that are parallel to said X dimension, said image controller system comprising:

storage means for storing said bit map to be displayed on said pre-determined area, said storage means including a plurality of memory cells with each of said memory cells associating with an address, and each of said plurality of bit positions associating with an address of said memory cells, means for indicating a scanning origin position of said bit map stored in said storage means, said scanning origin being located at any location on said pre-determined area, control means for controlling scanning of said bit map stored in said storage means according to said scanning origin position, and means for computing scanning addresses associated to said plurality bit positions, wherein said scanning addresses are computed based on said X and Y dimensions.

16. The system as in claim 15 wherein said means for indicating said scanning origin position includes:

means for indicating total scanning length of a bit-line along said X dimension.

17. The system as in claim 16 wherein said means for indicating said scanning origin position includes:
   means for indicating a scanning origin position on said pre-determined area along said Y dimension.

18. The system as in claim 17 comprising means for indicating total scanning bit-lines along said Y dimension.

19. The system as in claim 18 wherein comprising:
   means for indicating bit map scanning direction along said X dimension and/or said Y dimension.

20. The system as in claim 19 wherein said means for indicating bit map scanning direction comprising:
   first bit map scanning direction indicating means for indicating a first scanning direction and a second scanning direction along said X dimension, and wherein said address computing means computes said scanning addresses associated with said bit positions according to a scanning direction along said X dimension indicated by said first bit map scanning direction indicating means.

21. The system as in claim 20 wherein said means for indicating bit map scanning direction comprising:
   second bit map scanning direction indicating means for indicating a first scanning direction and a second scanning direction along said Y dimension, and wherein said address computing means computes said scanning addresses associated with said bit positions according to a scanning direction along said Y dimension indicated by said second bit map scanning direction indicating means.

22. The system as in claim 16 wherein said control means scans said storage means according to said scanning origin and said total scanning length of a bit-line along said X dimension.

23. The system as in claim 22 wherein said control means stops scanning a respective bit-line in said storage means along said X dimension after said total scanning length has been scanned out.

24. The system as in claim 23 wherein said control means scans said storage means according to said scanning origin and said total scanning bit-lines along said Y dimension.

25. The system as in claim 24 wherein said control means stops scanning said storage means along said Y dimension after said total scanning bit-lines along said Y dimension have been scanned out.

26. The system as in claim 25 wherein said address computing means computes said scanning addresses associated to said bit positions according to said scanning origin position and total scanning length of a bit-line along said X dimension, and said scanning origin position and total scanning bit-lines along said Y scanning dimension.

27. The system as in claim 26 wherein said means for indicating a scanning origin position further includes:
   means for indicating total length of a bit-line along said X dimension, wherein said address computing means computes said scanning addresses according to said total length.

* * * * *